(12) United States Patent
Mantor et al.

(10) Patent No.: US 8,473,721 B2
(45) Date of Patent: Jun. 25, 2013

(54) VIDEO INSTRUCTION PROCESSING OF DESIRED BYTES IN MULTI-BYTE BUFFERS BY SHIFTING TO MATCHING BYTE LOCATION

(75) Inventors: Michael J. Mantor, Orlando, FL (US); Jeffrey T. Brady, Orlando, FL (US); Christopher L. Spencer, Oviedo, FL (US); Daniel W. Wong, Cupertino, CA (US); Andrew E. Gruber, Arlington, MA (US)

(73) Assignees: Advanced Micro Devices, Inc., Sunnyvale, CA (US); ATI Technologies ULC, Markham, Ontario (CA)

( * ) Notice: Subject to any disclaimer, the term of this patent is extended or adjusted under 35 U.S.C. 154(b) by 575 days.

(21) Appl. No.: 12/762,020

(22) Filed: Apr. 16, 2010

(65) Prior Publication Data

US 2011/0057940 A1  Mar. 10, 2011

Related U.S. Application Data

(60) Provisional application No. 61/240,923, filed on Sep. 9, 2009.

(51) Int. Cl.
*G06F 9/30* (2006.01)
(52) U.S. Cl.
USPC .......................................... 712/221; 712/300
(58) Field of Classification Search
None
See application file for complete search history.

(56) References Cited

U.S. PATENT DOCUMENTS

| | | | |
|---|---|---|---|
| 7,254,699 B2 * | 8/2007 | Shepherd | 712/225 |
| 7,818,356 B2 * | 10/2010 | Chen et al. | 708/209 |
| 2005/0188182 A1 * | 8/2005 | Hoyle et al. | 712/224 |

* cited by examiner

*Primary Examiner* — Kenneth Kim
(74) *Attorney, Agent, or Firm* — Sterne, Kessler, Goldman & Fox P.L.L.C.

(57) ABSTRACT

Disclosed herein is a processing unit configured to process video data, and applications thereof. In an embodiment, the processing unit includes a buffer and an execution unit. The buffer is configured to store a data word, wherein the data word comprises a plurality of bytes of video data. The execution unit is configured to execute a single instruction to (i) shift bytes of video data contained in the data word to align a desired byte of video data and (ii) process the desired byte of the video data to provide processed video data.

15 Claims, 9 Drawing Sheets

VIDEO INSTRUCTION PROCESSING OF DESIRED BYTES IN MULTI-BYTE BUFFERS BY SHIFTING TO MATCHING BYTE LOCATION

CROSS REFERENCE TO RELATED APPLICATIONS

This application claims benefit under 35 U.S.C. §119(e) to U.S. Provisional Patent Application No. 61/240,923, entitled "Processing Unit to Implement Video Instructions and Applications Thereof," to Mantor et al., filed Sep. 9, 2009, the entirety of which is hereby incorporated by reference as if fully set forth herein.

BACKGROUND

1. Field of the Invention

The present invention is generally directed to computing operations performed in a computing system, such as computing operations performed by a processing unit (e.g., a graphics processing unit (GPU)) in a computing system.

2. Background Art

A GPU is a complex integrated circuit that is specially designed to perform data-parallel computing tasks, such as graphics-processing tasks. A GPU may, for example, execute graphics-processing tasks required by an end-user application, such as a video-game application.

There are several layers of software between the end-user application and the GPU. The end-user application communicates with an application-programming interface (API). An API allows the end-user application to output graphics data and commands in a standardized format, rather than in a format that is dependent on the GPU. Several types of APIs are commercially available, including DirectX® developed by Microsoft Corporation of Redmond, Wash. and OpenGL® maintained by the Khronos Group. The API communicates with a driver. The driver translates standard code received from the API into a native format of instructions understood by the GPU. The driver is typically written by the manufacturer of the GPU. The GPU then executes the instructions from the driver.

Although GPUs were historically configured to perform graphics-processing tasks, GPUs are currently being used more and more to perform general-compute operations. In particular, it may be desirable for a GPU to execute video-processing operations.

Unfortunately, conventional GPUs are not configured to efficiently process video data. Each pixel of video data is conventionally 8-bits wide. In contrast, conventional GPUs are typically configured to process memory words that are 32-bits wide. Due to the difference between the width of pixel data (e.g., 8 bits) and the native width of memory words in a typical GPU (e.g., 32 bits), a conventional GPU typically runs a plurality of logic operations over a plurality of clocks to process the video data.

What is needed, therefore, is a GPU, and applications thereof, that can efficiently process video data.

SUMMARY OF EMBODIMENTS OF THE INVENTION

The present invention meets the above-described needs by providing methods, apparatuses, and systems for efficiently processing video data in a processing unit.

For example, an embodiment of the present invention provides a method for implementing a single instruction to process video data in a processing unit. In accordance with this method, bytes of video data contained in a data word are shifted to align a desired byte of the video data, wherein the data word comprises a plurality of bytes of video data. The desired byte of the video data is processed to provide processed video data.

Another embodiment of the present invention provides a processing unit configured to process video data. In an embodiment, the processing unit includes a buffer and an execution unit. The buffer is configured to store a data word, wherein the data word comprises a plurality of bytes of video data. The execution unit is configured to execute a single instruction to (i) shift bytes of video data contained in the data word to align a desired byte of video data and (ii) process the desired byte of the video data to provide processed video data.

A further embodiment of the present invention provides a computing system for processing video data, including a memory, a processing unit, and a bus coupled to the memory and the processing unit. The processing unit includes a buffer and an execution unit. The buffer is configured to store a data word, wherein the data word comprises a plurality of bytes of video data. The execution unit is configured to execute a single instruction to (i) shift bytes of video data contained in the data word to align a desired byte of video data and (ii) process the desired byte of the video data to provide processed video data.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 7A:
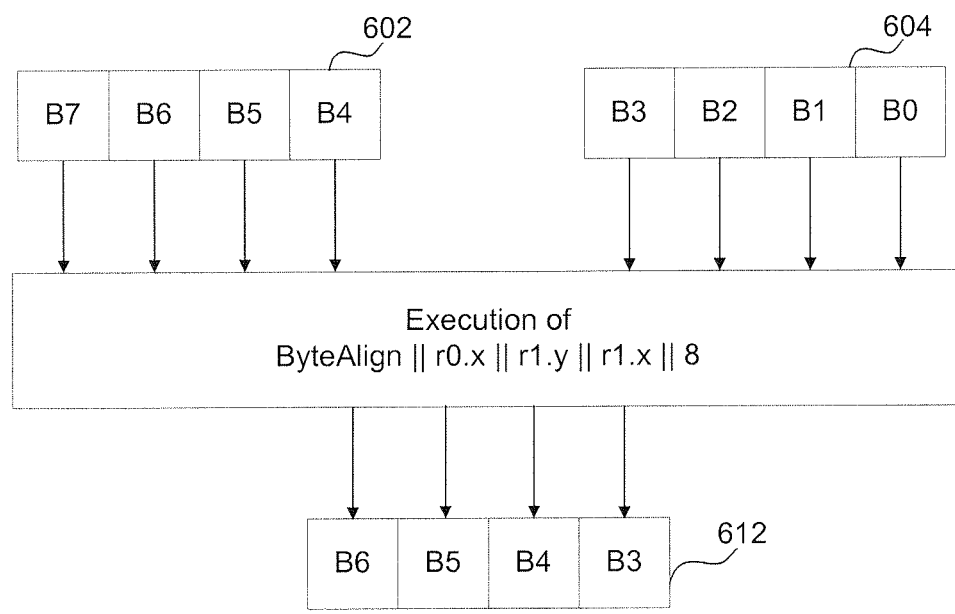
Figure 7B:
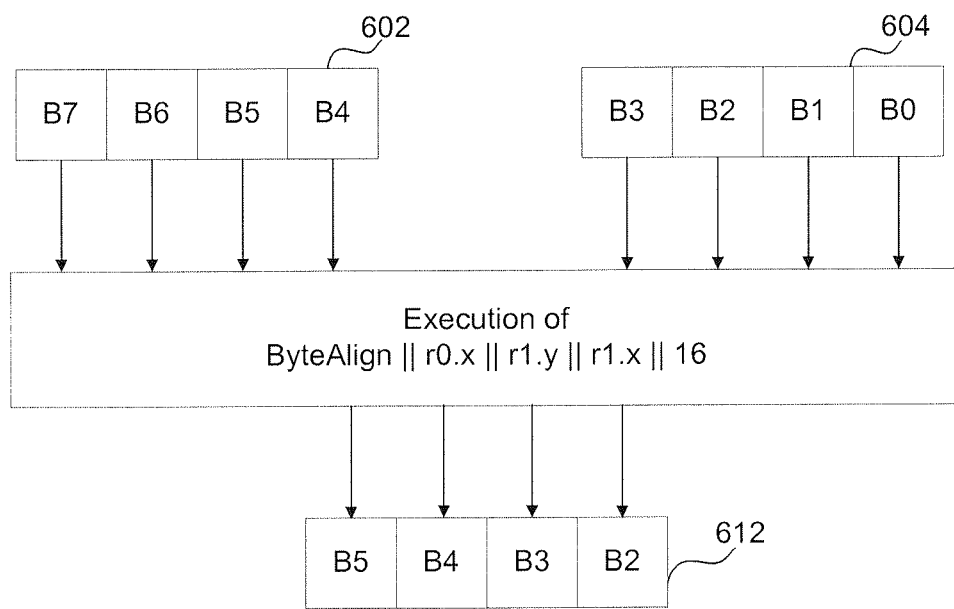
Figure 7C:
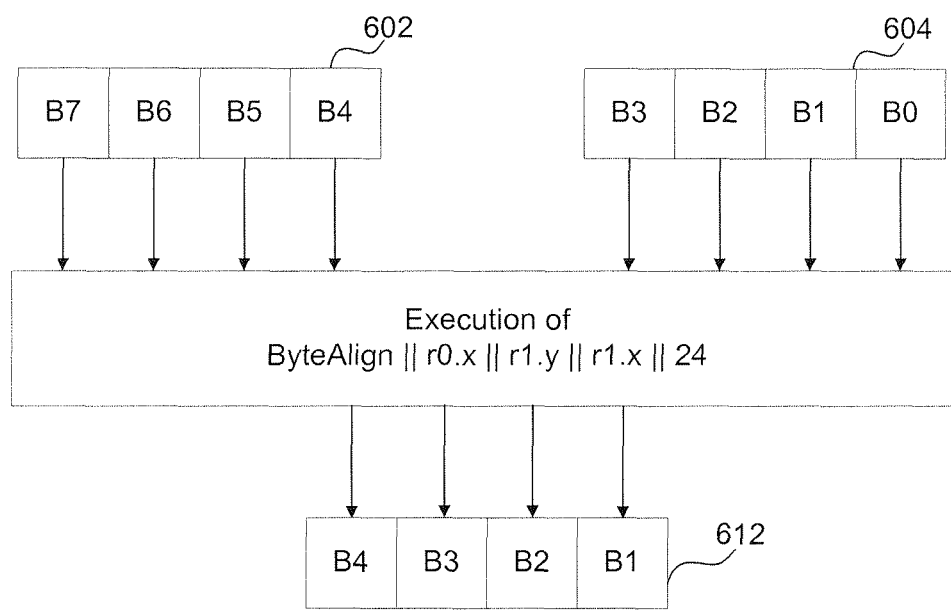

FIGS. 7A, 7B, and 7C illustrate how the contents of two source registers are shifted to provide results in a destination register based on the execution of a video instruction in accordance with an embodiment of the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structur-

DETAILED DESCRIPTION

I. Overview

Embodiments of the present invention provide a processing unit that enables the execution of video instructions and applications thereof. In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

According to an embodiment, a processing unit includes an execution unit that is configured to receive a plurality of bytes of video data and execute a single instruction to process the plurality of bytes of video data. In one clock cycle, for example, the execution unit may execute a single instruction to process four 8-bit bytes of video data and provide the processed video data as output. In this way, the execution unit of embodiments of the present invention can process video data in a more-efficient manner than execution units of conventional processing units.

For illustrative purposes only, and not limitation, embodiments of the present invention will be described herein in terms of a graphics processing unit (GPU) that is configured to process video data. A person skilled in the relevant art(s) will appreciate, however, that embodiments of the present invention include other types of processing units—such as central processing units (CPUs) and co-processors—that process, or are configured to process, video data. These other types of processing units are contemplated within the spirit and scope of the present invention.

Further details of an example GPU in accordance with an embodiment of the present invention are described below. Before providing these details, however, it is helpful to describe an example system in which such a GPU may be implemented.

II. An Example System

Figure 1:
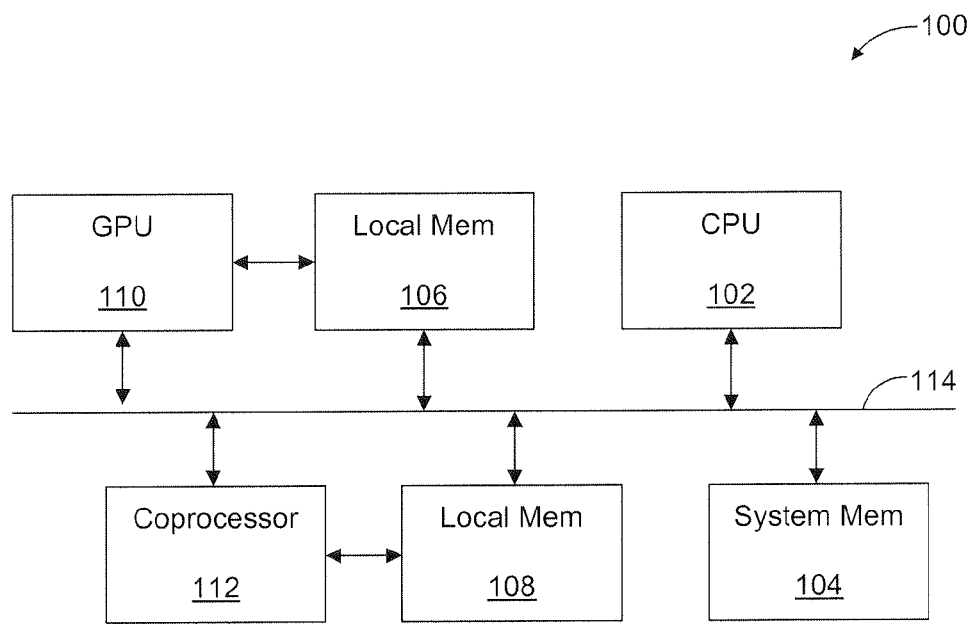
FIG. 1 is a block diagram of an example computing system in accordance with an embodiment of the present invention.

FIG. 1 is a block diagram of a computing system 100 according to an embodiment. Computing system 100 includes a CPU 102, a GPU 110, and may optionally include a coprocessor 112. In the embodiment illustrated in FIG. 1, CPU 102 and GPU 110 are included on separate integrated circuits (ICs) or packages. In other embodiments, however, CPU 102 and GPU 110, or the collective functionality thereof, may be included in a single IC or package.

In addition, computing system 100 also includes a system memory 104 that may be accessed by CPU 102, GPU 110, and coprocessor 112. In embodiments, computing system 100 may comprise a supercomputer, a desktop computer, a laptop computer, a video-game console, an embedded device, a handheld device (e.g., a mobile telephone, smart phone, MP3 player, a camera, a GPS device, or the like), or some other device that includes or is configured to include a GPU.

Although not specifically illustrated in FIG. 1, computing system 100 may also include a display device (e.g., cathode-ray tube, liquid crystal display, plasma display, etc.) for displaying content (e.g., graphics, video, etc.) of computing system 100. The display device is used to display content to a user (such as, when computing system 100 comprises a computer, video-game console, or handheld device).

GPU 110 assists CPU 102 by performing certain special functions (such as, graphics-processing tasks and data-parallel, general-compute tasks), usually faster than CPU 102 could perform them in software. In embodiments, GPU 110 may be integrated into a chipset and/or CPU or other processor. Additional details of GPU 110 are provided below.

Coprocessor 112, an exemplary processor, also assists CPU 102. Coprocessor 112 may comprise, but is not limited to, a floating point coprocessor, a GPU, a video processing unit (VPU), a networking coprocessor, and other types of coprocessors and processors as would be apparent to a person skilled in the relevant art(s).

GPU 110 and coprocessor 112 communicate with CPU 102 and the system memory over a bus 114. Bus 114 may be any type of bus used in computer systems, including a peripheral component interface (PCI) bus, an accelerated graphics port (AGP) bus, a PCI Express (PCIE) bus, or another type of bus whether presently available or developed in the future.

In addition to system memory 104, computing system 100 further includes local memory 106 and local memory 108. Local memory 106 is coupled to GPU 110 and may also be coupled to bus 114. Local memory 108 is coupled to coprocessor 112 and may also be coupled to bus 114. Local memories 106 and 108 are available to GPU 110 and coprocessor 112 respectively in order to provide faster access to certain data (such as data that is frequently used) than would be possible if the data were stored in system memory 104.

In an embodiment, GPU 110 and coprocessor 112 decode instructions in parallel with CPU 102 and execute only those instructions intended for them. In another embodiment, CPU 102 sends instructions intended for GPU 110 and coprocessor 112 to respective command buffers.

III. An Example GPU

Figure 2:
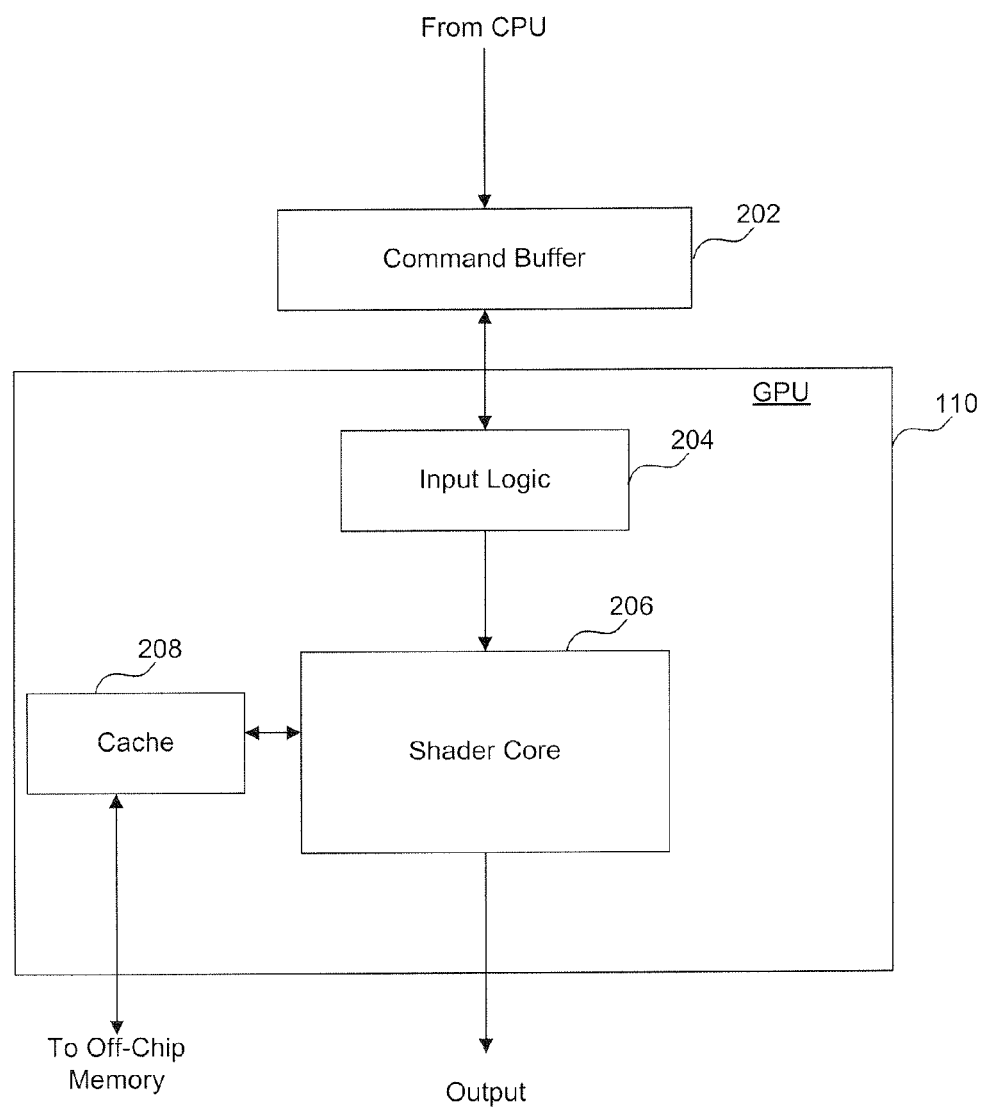
FIGS. 2 and 3 are block diagrams of an example GPU in accordance with an embodiment of the present invention.
Figure 3:
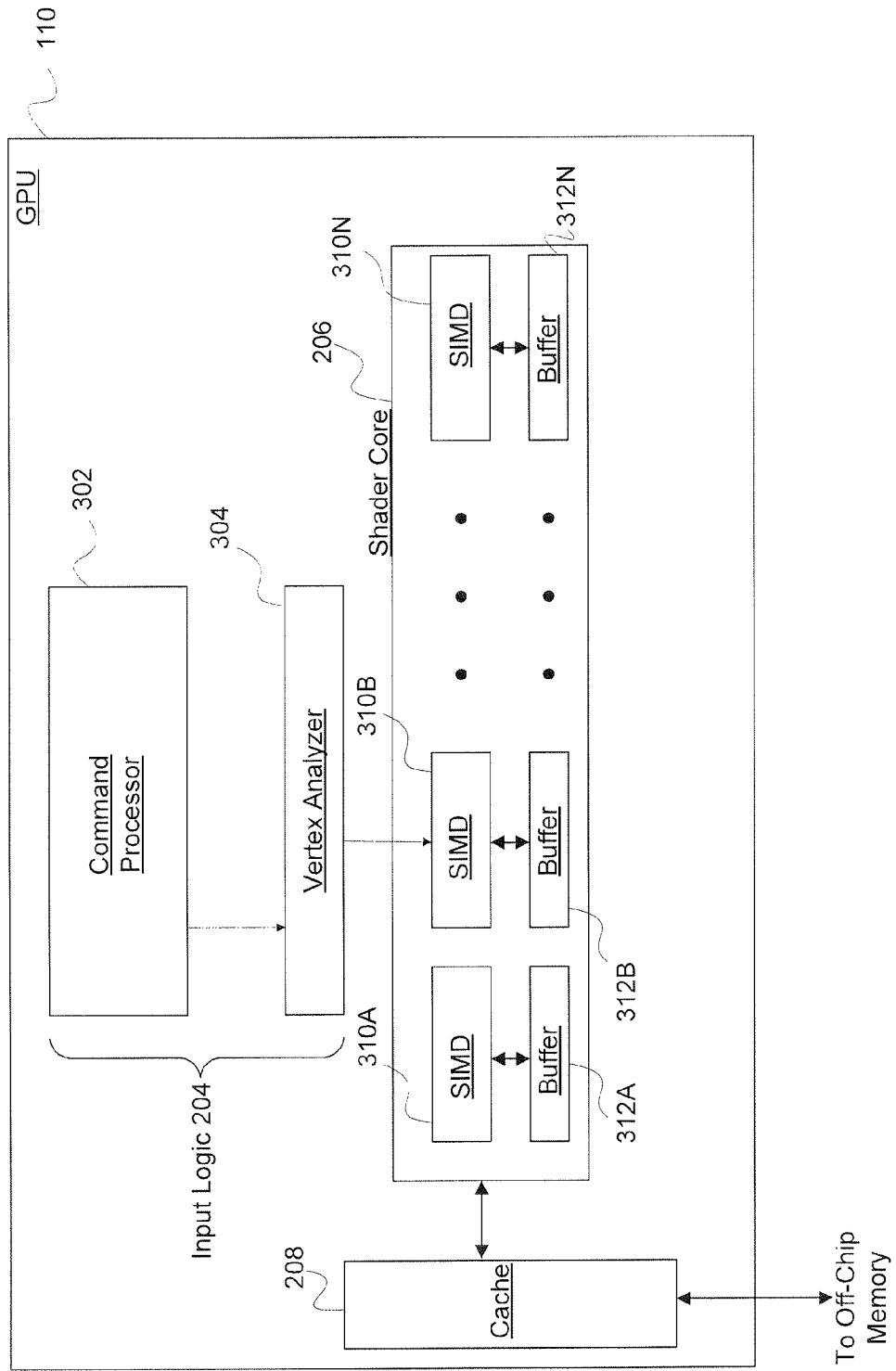

FIGS. 2 and 3 are block diagrams of an example GPU 110 in accordance with an embodiment of the present invention. As shown in the embodiment of FIG. 2, GPU 110 is coupled to a command buffer 202 and includes input logic 204, a shader core 206, and a cache 208.

Input logic 204 performs pre-processing on the graphics-processing tasks and general-compute tasks. As illustrated in FIG. 3, input logic 204 may include a command processor 302 and a vertex analyzer 304.

Command processor 302 receives the tasks to be executed by GPU 110. For example, command processor 302 may receive a video instruction to be executed by GPU 110 in accordance with an embodiment of the present invention. The execution of such a video instruction is described in more detail below. Command processor 302 then passes the tasks to vertex analyzer 304.

Vertex analyzer 304 identifies all the shader programs associated with a graphics-processing and/or general-compute task, and schedules when each shader program can be launched in shader core 206 based on input and output data that will be available. For example, a particular graphics-processing task may require the execution of a first shader program (e.g., a vertex shader) and a second shader program (e.g., a pixel shader), wherein the second shader program is dependent on data generated by the first shader program. In accordance with this example, vertex analyzer 304 identifies the first and second shader programs and schedules the first shader program to be executed before the second shader program, so that the data for the second shader program will be available when the second shader program is launched. After pre-processing the graphics-processing and general-compute tasks, vertex analyzer 304 issues these tasks to shader core 206.

Shader core 206 includes a plurality of compute resources or execution units (e.g., arithmetic logic units (ALUs)). The tasks to be executed by shader core 206 may be broken up into a plurality of work loads, wherein work loads may be issued to different compute resources or execution units (e.g., ALUs) in parallel. Input logic 204 keeps track of which workloads are processed by the different compute resources or execution units (e.g., ALUs) within shader core 206, enabling a plurality of threads to execute in parallel. In an embodiment, for example, more than 30,000 threads may execute in shader core 206 at any one time. The results of the operations of shader core 206 are sent to an output buffer (such as, for example, a frame buffer). The output buffer may be included on the same chip as GPU 110 or may be included in an off-chip memory.

Cache 208 stores data that is frequently used by shader core 206. When data is needed by shader core 206 to execute a shader program, first a request is made to cache 208. If there is a cache hit in cache 208 (i.e., the requested data is in cache 208), the data is forwarded to shader core 206. If there is a cache miss in cache 208 (i.e., the requested data is not in cache 208), the request data is retrieved from off-chip memory. In an embodiment, cache 208 comprises one or more level 1 (L1) caches and one or more level 2 (L2) caches, wherein the L1 caches have less storage capacity but provide faster data access than the L2 caches. As explained in more detail below, cache 208 and/or off-chip memory may store video data to be processed by shader core 206.

In a unified shader model, GPU 110 executes a sequence of shaders. To execute the shaders, each compute resource or execution unit (e.g., ALU) of GPU 110 may comprise a single-instruction multiple-data (SIMD) unit. For example, FIG. 3 illustrates that GPU 110 includes a plurality of SIMDs 310A through 310N. Each SIMD 310 is associated with its own buffer 312. Each buffer 312 is configured to hold a plurality of bytes of video data that are to be processed by SIMDs 310 of GPU 110. That is, video data from off-chip memory and/or cache 208 is loaded into one or more of buffers 312 to enable SIMDs 310 to process the video data. For example, in an embodiment, each buffer 312 is 32-bits wide, and each byte of video data in 8-bits wide. Accordingly, in this example, each buffer 312 is configured to hold four 8-bit bytes of video data.

As explained in more detail below, GPU 110 is configured to execute a single instruction to process video data in accordance with an embodiment of the present invention. Before describing the execution of such a single instruction, described below are additional details of an example computing system of embodiments of the present invention.

IV. Additional Details of an Example Computing System

Figure 4:
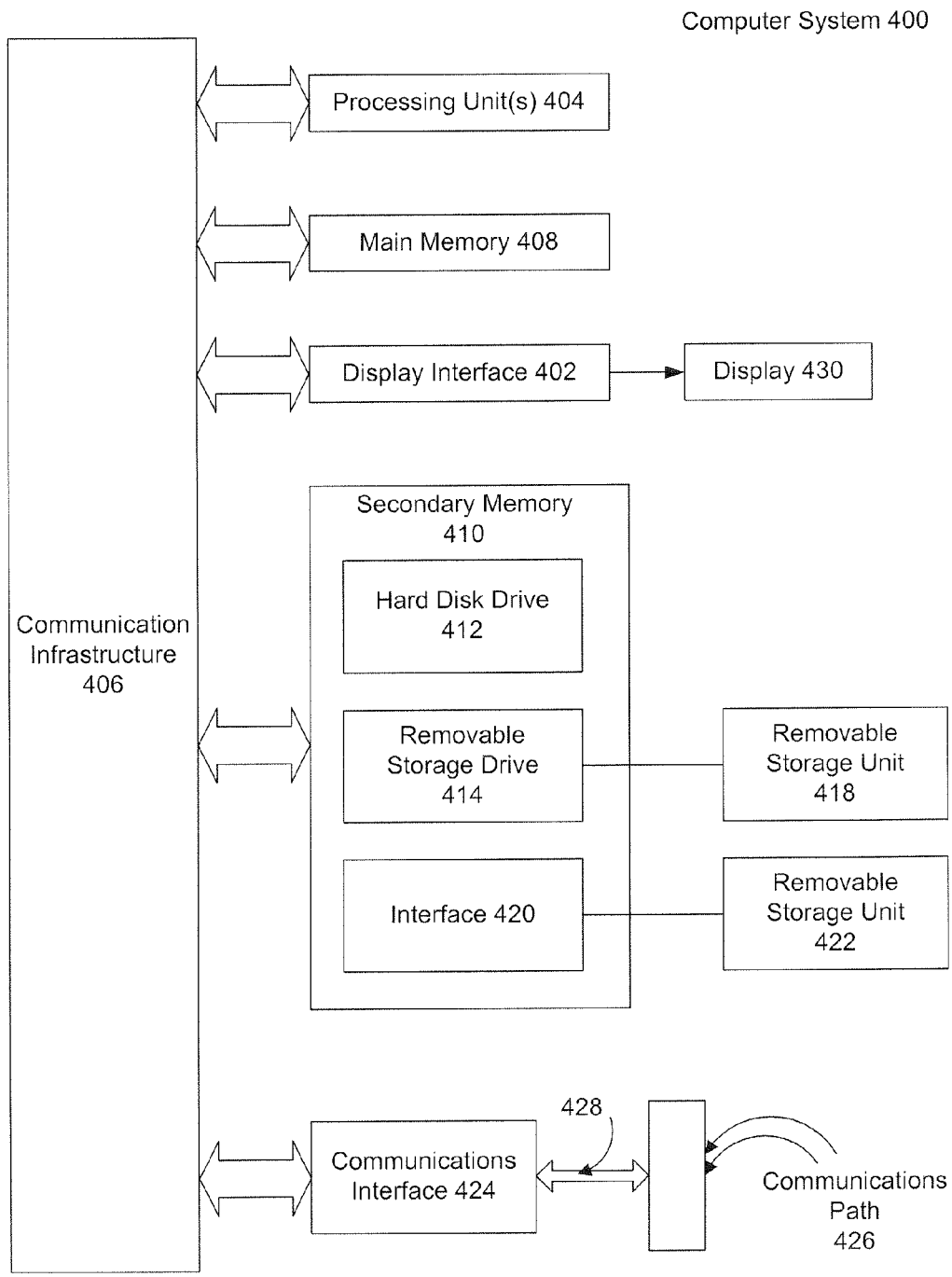
FIG. 4 is a block diagram illustrating additional components included in an example computing system in accordance with an embodiment of the present invention.

As set forth above, FIG. 1 illustrates an example computing system 100 of an embodiment of the present invention. FIG. 4 illustrates additional components that may be included in an example computing system 400 in accordance with an embodiment of the present invention.

Computing system 400 includes one or more processing units 404. Processing unit(s) 404 may be a general-purpose processing unit (such as, CPU 102 of FIG. 1) or a special-purpose processing unit (such as, GPU 110 of FIG. 1). Processing unit(s) 404 is (are) connected to a communication infrastructure 406 (e.g., a communications bus (such as bus 114 of FIG. 1), a cross-over bar, or a network).

Computing system 400 also includes a display interface 402 that forwards graphics, text, and other data from communication infrastructure 406 (or from a frame buffer not shown) for display on display unit 430 (such as, a liquid crystal display).

Computing system 400 also includes a main memory 408, preferably random access memory (RAM), such as system memory 104 of FIG. 1. In addition, computing system 400 may also include a secondary memory 410. The secondary memory 410 may include, for example, a hard disk drive 412 and/or a removable storage drive 414, representing a floppy disk drive, a magnetic tape drive, an optical disk drive, etc. The removable storage drive 414 reads from and/or writes to a removable storage unit 418 in a well-known manner. Removable storage unit 418 represents a floppy disk, magnetic tape, optical disk, etc. which as read by and written to by removable storage drive 414. As will be appreciated, the removable storage unit 418 includes a computer-readable storage medium having stored therein computer software and/or data.

In alternative embodiments, secondary memory 410 may include other similar devices for allowing computer programs or other instructions to be loaded into computing system 400. Such devices may include, for example, a removable storage unit 422 and an interface 420. Examples of such may include a program cartridge and cartridge interface (such as that found in video game devices), a removable memory chip (such as an erasable programmable read only memory (EPROM), or programmable read only memory (PROM)) and associated socket, and other removable storage units 422 and interfaces 420, which allow software and data to be transferred from the removable storage unit 422 to computing system 400.

Computing system 400 may also include a communications interface 424. Communications interface 424 allows software and data to be transferred between computing system 400 and external devices. Examples of communications interface 424 may include a modem, a network interface (such as an Ethernet card), a communications port, a Personal Computer Memory Card International Association (PCMCIA) slot and card, etc. Software and data transferred via communications interface 424 are in the form of signals 428 which may be electronic, electromagnetic, optical or other signals capable of being received by communications interface 424. These signals 428 are provided to communications interface 424 via a communications path (e.g., channel) 426. This channel 426 carries signals 428 and may be implemented using wire or cable, fiber optics, a telephone line, a cellular link, an radio frequency (RF) link and other communications channels.

In this document, the term "computer-readable storage medium" is used to generally refer to media such as removable storage drive 414 and a hard disk installed in hard disk drive 412. These computer program products provide software to computing system 400.

Computer programs (also referred to as computer control logic or instructions) are stored in main memory 408 and/or secondary memory 410. Computer programs may be loaded into computing system 400 using removable storage drive 414, hard drive 412, or communications interface 424. Such computer programs, when executed, enable the computing system 400 to perform features of embodiments of the present invention, as discussed herein. For example, the computer programs, when executed, enable at least one of processing unit 404 to execute a video instruction to process video data in accordance with an embodiment of the present invention. An example of such a processing operation is described below.

V. Example Operation

Figure 5:
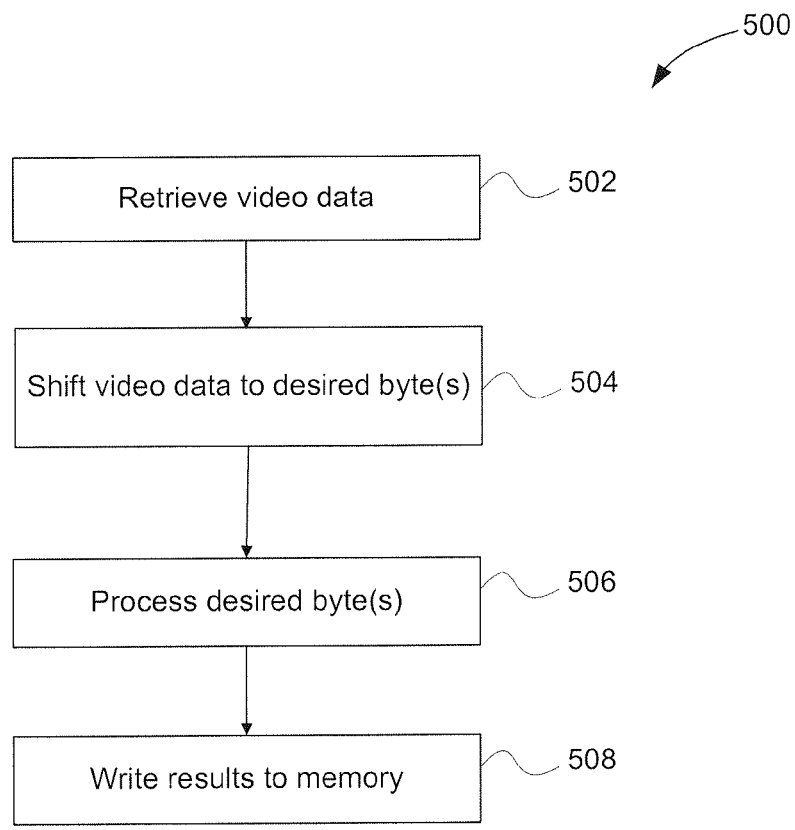
FIG. 5 is a flowchart illustrating an example method for executing a video instruction in accordance with an embodiment of the present invention.

FIG. 5 is a flowchart illustrating an example method 500 for executing a video instruction in accordance with an embodiment of the present invention. That is, by executing the video instruction in accordance with an embodiment of the present invention, a processing unit implements the operations of method 500. For illustrative purposes, method 500 is described below with reference to components of GPU 110 illustrated in FIG. 3. It is to be appreciated, however, that method 500 may be implemented by other types of processing units (such as, for example, CPU 102, coprocessor 112, or another type of processing unit).

Referring to FIG. 5, method 500 begins at a step 502 in which video data is retrieved. The video data may be retrieved, for example, from cache 208 or off-chip memory, as explained above. After retrieving the video data, it is stored in one of buffers 312. As explained herein, the video data is not the same width as a data word of GPU 110. As a result, the video data stored in buffer 312 comprises a plurality of bytes of video data. For example, GPU 110 may be configured to process data words that are 32-bits wide. In contrast, video data typically comprises 8-bit bytes. In this example, therefore, buffer 32 stores four 8-bit bytes of video data.

In step 504, the video data is shifted to align one or more desired bytes. As used herein, a "desired byte" refers to a byte of video data on which processing is to be performed. Because buffer 312 includes a plurality of bytes of video data, a desired byte in that plurality of bytes may need to be aligned for further processing. For example, first buffer 312A may include four 8-bit bytes of video data, and second buffer 312B may also include four 8-bit bytes of video data. For convenience, the four bytes of video data in first buffer 312A may be labeled B3, B2, B1, and B0, and the four bytes of video data in second buffer 312B may be labeled B7, B6, B5, and B4. During video processing, it may be desirable to perform operations (e.g., an integer add) on B6 and B1. However, B6 and B1 are not aligned at the same relative position within first buffer 312A and second buffer 312B. In accordance with step 504, however, the contents of first buffer 312A and/or second buffer 312B may be shifted to align B6 and B1.

In step 506, the one or more desired bytes are processed. The processing of the desired bytes of video data comprises a mathematical and/or logic operation performed by an execution unit (e.g., SIMD 310). Such processing may involve several passes through the execution unit. For example, the execution unit may perform an operation on input data from one or more buffers 312 and may write intermediate results of this operation to a buffer 312. The intermediate results may then be further processed by the execution unit to provide either additional intermediate results (which will be further processed) or a final result.

In step 508, the result is written to memory. For example, the result of the operation on the one or more desired bytes of video data may be written to cache 208 and/or off-chip memory.

As mentioned above, method 500 may be implemented by executing a video instruction in accordance with an embodiment of the present invention. In an embodiment, the video instruction specifies an operation to be performed (e.g., byte align), a destination register, a first source register, a second source register (optional), and a number of bits to shift. Implementation of this video instruction specifies valid src_c values as bit positions and renames "bit align." In this embodiment, allowable inputs are 0, 8, 16, 24 or bits 3 and 4 used to determine alignment.

Figure 6:
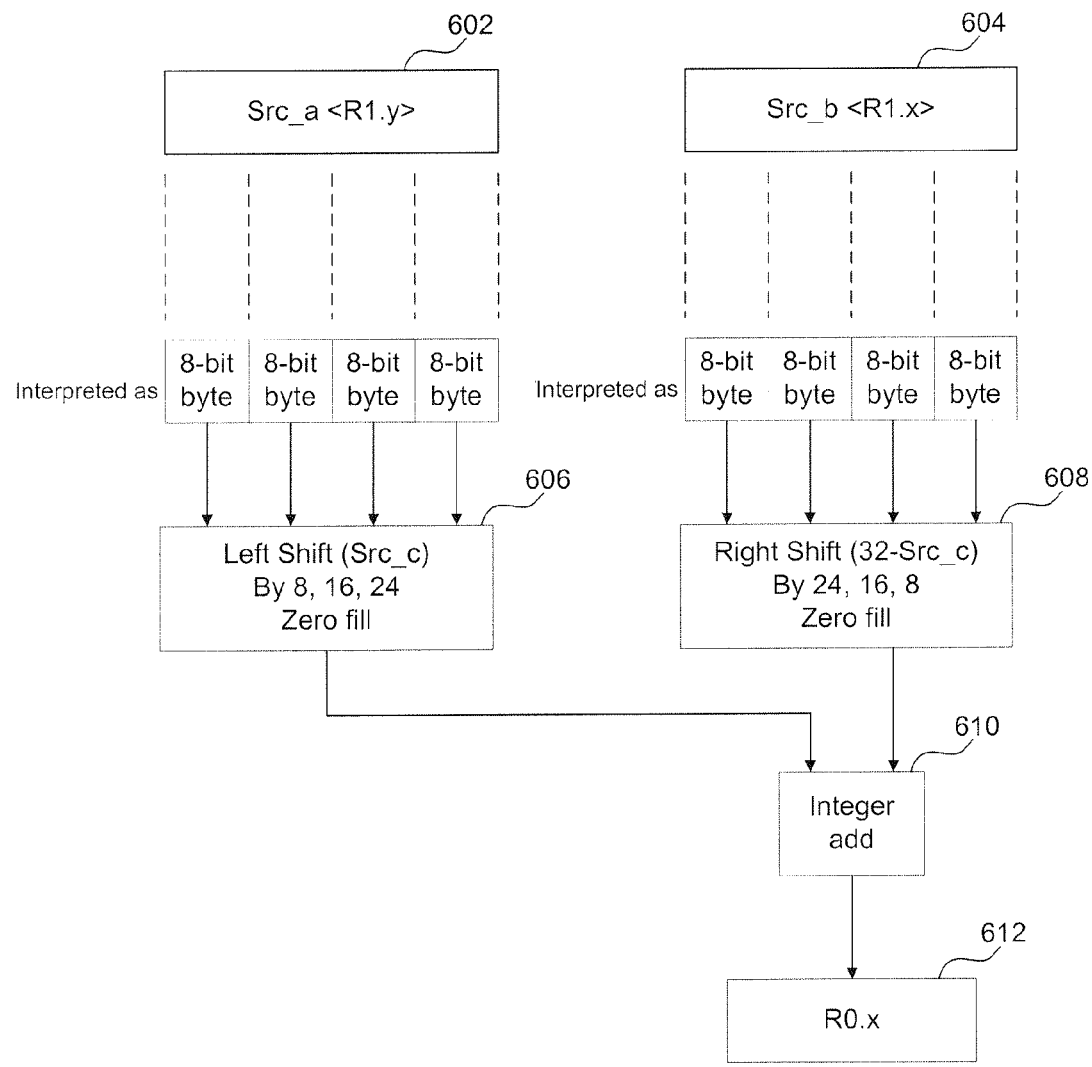
FIG. 6 is a flowchart, illustrating example operations included in the execution of the video instruction of FIG. 5.

FIG. 6 is a flowchart illustrating example operations included in the execution of the video instruction of FIG. 5. For illustrative purposes, these operations will be described below in terms of components of GPU 110 illustrated in FIG. 3.

In the embodiment of FIG. 6, two source registers are identified: a first register 602 (e.g. R1.y) and a second register 604 (e.g., R1.x). First register 602 and second register 604 may reside on off-chip memory, but the video data stored in these registers may also be included in cache 208. In either case, the video data stored in first register 602 and second register 604 is respectively loaded into two different local buffers of 312 of GPU 110. During execution of the video instruction, the contents of first and second registers 602, 604 are interpreted as four 8-bit bytes of video data. For example, first register 602 may store four bytes of video data, labeled B7, B6, B5, and B4; and second register 604 may also store four bytes of video data, labeled B3, B2, B1, and B0.

To properly align a desired byte of video data, bytes B7, B6, B5, and B4 (which were previously stored in first register 602) may be left shifted by 8-, 16-, or 24-bits and then zero filled, as illustrated in block 606. Similarly, bytes B3, B2, B1, and B0 (which were previously stored in second register 604) may be right shifted by 24-, 16-, or 8-bits and then zero filled, as illustrated in block 608.

After aligning the one or more desired bytes, these bytes may be processed by performing mathematical and/or logic operations. As illustrated in the example of FIG. 6, the shifted contents of blocks 606 and 608 may be added by an integer add block 610 and then stored in an output register 612 (e.g. R0.x).

The video instruction may include a plurality fields: (i) a first field to specify a type of operation (e.g., ByteAlign); (ii) a second field to identify a destination register (e.g., r0.x); (iii) a third field to identify a first source register (e.g., r1.y); (iv) a fourth field to identify a second source register (e.g., r1.x); and (v) a fifth field to identify a number of bits to be shifted (e.g., 8, 16, or 24 bits). For example, the video instruction may have the following form:

operation||destination register||source register||source register||shift

For example, the video instruction may be implemented with the following pseudo-code:

BYTE_ALIGN-result=(src_a<<src_c)|(src_b>> (32-src_c))

FIGS. 7A, 7B, and 7C illustrate example results of implementing a video instruction in accordance with an embodiment of the present invention. In the example of each of these figures, first source register 602 (e.g., R1.y) had bytes B7, B6, B5, and B4; and second source register 604 (e.g., R1.x) had bytes B3, B2, B1, and B0.

FIG. 7A illustrates the implementation of a left shift by 8 bits. That is, this figure illustrates the execution of a video instruction specified as ByteAlign||r0.x||r1.y||r1.x||8

As a result of the execution of this video instruction, destination register 612 (e.g., r0.x) includes bytes B6, B5, B4, and B3, as illustrated in FIG. 7A.

FIG. 7B illustrates the implementation of a left shift by 16 bits. That is, this figure illustrates the execution of a video instruction specified as ByteAlign||r0.x||r1.y||r1.x||16

As a result of the execution of this video instruction, destination register 612 (e.g., r0.x) includes bytes B5, B4, B3, and B2, as illustrated in FIG. 7B.

FIG. 7C illustrates the implementation of a left shift by 32 bits. That is, this figure illustrates the execution of a video instruction specified as ByteAlign||r0.x||r1.y||r1.x||32

As a result of the execution of this video instruction, destination register 612 (e.g., r0.x) includes bytes B4, B3, B2, and B1, as illustrated in FIG. 7C.

The execution of this video instruction uses existing shifters for bit-field extract/insert and adder alignment shift with opcode-based control to determine second shift value and controls for merge of two shifted values. This instruction is available in slots 0-3 and enables each slot to align a row of data to be prepped for a subsequent operation in one very long instruction word (VLIW) instruction.

In addition, the result can be bit align. To bit align, specify valid src_c values as byte positions 0, 1, 2, or 3. Bits 0 and 1 are used to determine alignment. The src_c is a register input. The bit alignment can be implemented with the following pseudo-code:

BYTE_ALIGN-result=(src_a<<((src_c&3)<<3))|
(src_b>>(32-((src_c&3)<<3)))

This instruction assumes that data in src_a and src_b are fetched in little-endian mode.

In the embodiment of FIGS. 6 and 7, registers are illustrated as 32-bits wide and are configured to store four 8-bit bytes of video data. This is for illustrative purposes only, and not limitation. A person skilled in the relevant art(s) will appreciate that registers in accordance with an embodiment of the present invention may be wider or narrower than 32 bits.

Further, FIG. 6 illustrates that contents of two different source registers are processed during the execution of a video instruction of an embodiment of the present invention. This also is for illustrative purposes only, and not limitation. A person skilled in the relevant art(s) will appreciate after reading the description contained herein that one or more bytes of video data from a single register may be processed by executing a video instruction in accordance with an embodiment of the present invention.

VI. Example Software Implementations

In addition to hardware implementations of processing units of embodiments of the present invention (e.g., CPU 102 and/or GPU 110), such processing units may also be embodied in software disposed, for example, in a computer-readable medium configured to store the software (e.g., a computer-readable program code). The program code causes the enablement of embodiments of the present invention, including the following embodiments: (i) the functions of the systems and techniques disclosed herein (such as, execution of a video instruction); (ii) the fabrication of the systems and techniques disclosed herein (such as, the fabrication of CPU 102 and/or CPU 110); or (iii) a combination of the functions and fabrication of the systems and techniques disclosed herein.

This can be accomplished, for example, through the use of general-programming languages (such as C or C++), hardware-description languages (HDL) including Verilog HDL, VHDL, Altera HDL (AHDL) and so on, or other available programming and/or schematic-capture tools (such as circuit-capture tools). The program code can be disposed in any known computer-readable medium including semiconductor, magnetic disk, or optical disk (such as CD-ROM, DVD-ROM). As such, the code can be transmitted over communication networks including the Internet and internets. It is understood that the functions accomplished and/or structure provided by the systems and techniques described above can be represented in a core (such as a CPU core and/or a GPU core) that is embodied in program code and may be transformed to hardware as part of the production of integrated circuits.

VII. Conclusion

Disclosed above are processing units for implementing a video instruction, and applications thereof. It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

What is claimed is:

1. A method for implementing a single instruction to process video data in a processing unit, the method comprising:
    retrieving a first plurality of bytes of video data into a first data buffer;
    retrieving a second plurality of bytes of video data into a second data buffer;
    identifying a first desired byte in the first data buffer and a second desired byte in the second data buffer, wherein the first and second desired bytes are identified based on the single instruction;
    determining an alignment position of the first desired byte and the second desired byte based on a processing operation of the single instruction;
    shifting at least one of the first data buffer or the second data buffer based on the determined alignment position, wherein the first desired byte is aligned with the second desired byte at a matching byte location; and
    processing the first desired byte and the second desired byte to provide processed video data.

2. The method of claim 1, wherein the shifting and the processing are performed in a single clock cycle.

3. The method of claim 1, wherein the shifting comprises:
    shifting the first data buffer including a data word to align the first desired byte of the video data, wherein the data word comprises four 8-bit bytes of video data.

4. The method of claim 1, wherein the shifting further comprises:
    shifting the second data buffer including a second data word to align the second desired byte of the video data, wherein the second data word comprises four 8-bit bytes of video data.

5. The method of claim 3, wherein the shifting comprises:
    shifting the first data buffer including the data word by at least one of eight bits, sixteen bits, or twenty-four bits.

6. A processing unit configured to process video data, comprising:
    a first buffer configured to store a first plurality of bytes of video data;
    a second buffer configured to store a second plurality of bytes of video data; and an execution unit configured to execute a single instruction to
  identify a first desired byte in the first buffer and a second desired byte in the second buffer, wherein the first and second desired bytes are identified based on the single instruction,
  determine an alignment position of the first desired byte and the second desired byte based on a processing operation of the single instruction,
  shift at least one of the first buffer or the second buffer based on the determined alignment position, wherein the first desired byte is aligned with the second desired byte at a matching byte location and
  process the first desired byte and second desired byte to provide processed video data.

7. The processing unit of claim 6, wherein the execution unit is configured to execute the single instruction in a single clock cycle.

8. The processing unit of claim 6, wherein the first plurality of bytes of video data comprises four 8-bit bytes of video data.

9. The processing unit of claim 6, wherein the execution unit is configured to execute the single instruction to shift the first data buffer by at least one of eight bits, sixteen bits, or twenty-four bits, to align the first desired byte with the second desired byte.

10. The processing unit of claim 6, wherein the processing unit comprises a graphics processing unit.

11. A computing system for processing video data, comprising:
  a memory;
  a processing unit; and
  a bus coupled to the memory and the processing unit;
  wherein the processing unit comprises:
    a first buffer configured to store a first plurality of bytes of video data;
    a second buffer configured to store a second plurality of bytes of video data; and
    an execution unit configured to execute a single instruction to
      identify a first desired byte in the first buffer and a second desired byte in the second buffer, wherein the first and second desired bytes are identified based on the single instruction,
      determine an alignment position of the first desired byte and the second desired byte based on a processing operation of the single instruction,
      shift at least one of the first buffer or the second buffer based on the determined alignment position, wherein the first desired byte is aligned with the second desired byte at a matching byte location and
      process the first desired byte and second desired byte to provide processed video data.

12. The computing system of claim 11, wherein the execution unit is configured to execute the single instruction in a single clock cycle.

13. The computing system of claim 11, wherein the first plurality of bytes of video data comprises four 8-bit bytes of video data.

14. The computing system of claim 11, wherein the execution unit is configured to execute the single instruction to shift the first data buffer by at least one of eight bits, sixteen bits, or twenty-four bits, to align the first desired byte with the second desired byte.

15. The computing system of claim 11, wherein the processing unit comprises a graphics processing unit.

* * * * *